Nov. 28, 1939.  T. C. DELAVAL-CROW ET AL  2,181,425
DRIVING MECHANISM FOR CYCLES
Filed Oct. 20, 1936  3 Sheets-Sheet 3
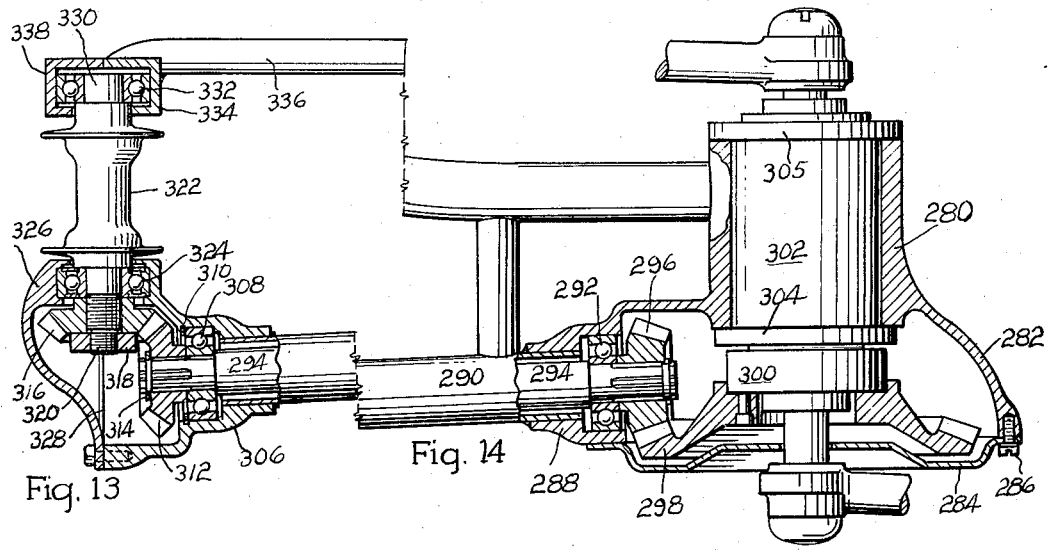
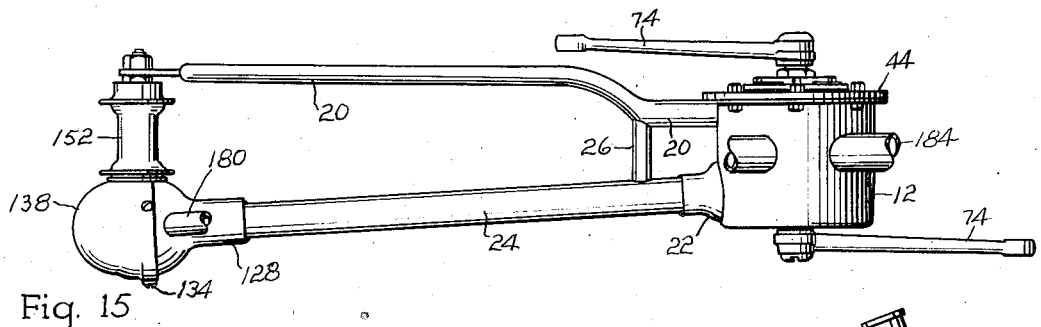
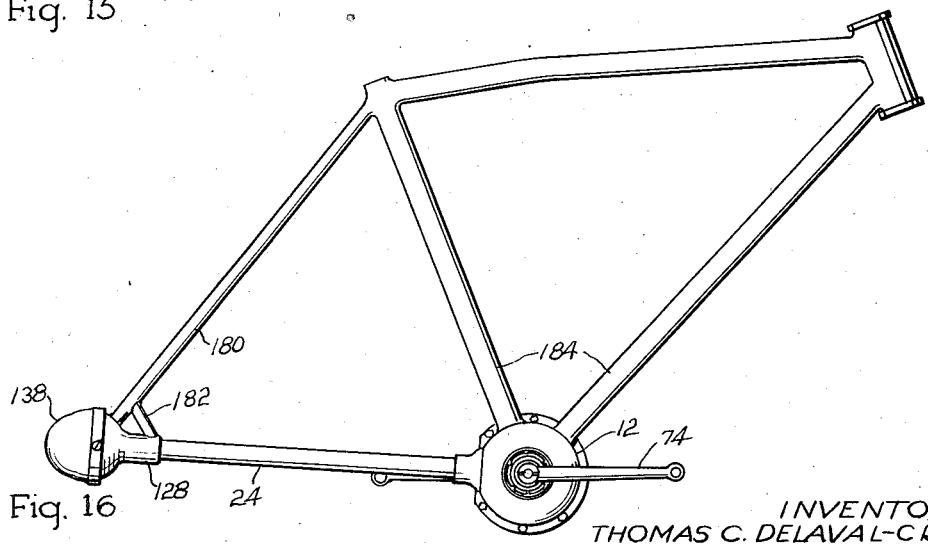
INVENTORS:
THOMAS C. DELAVAL-CROW,
EDWARD W. GLACY,
BY *Gales V. Moore*
THEIR ATTORNEY.

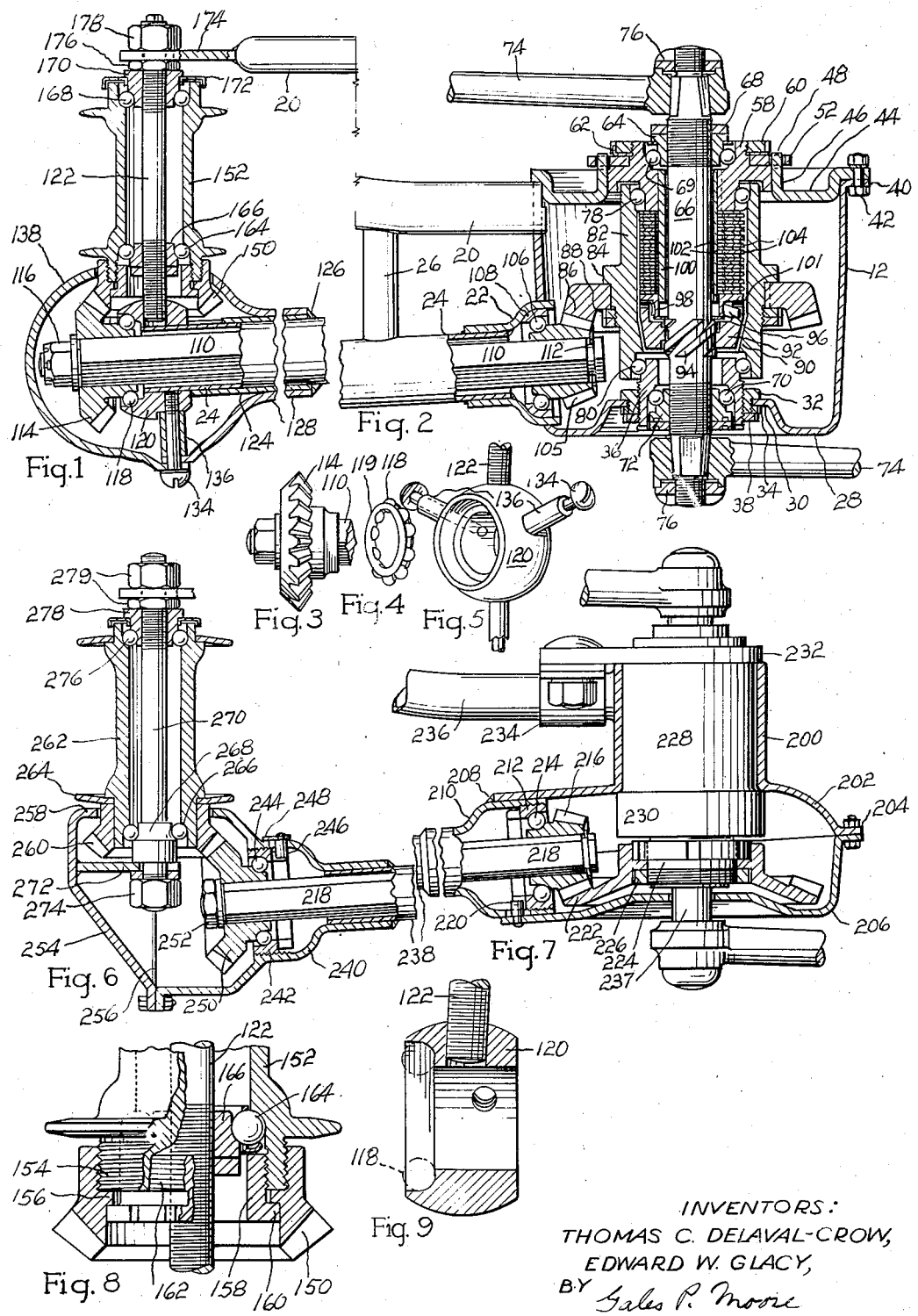

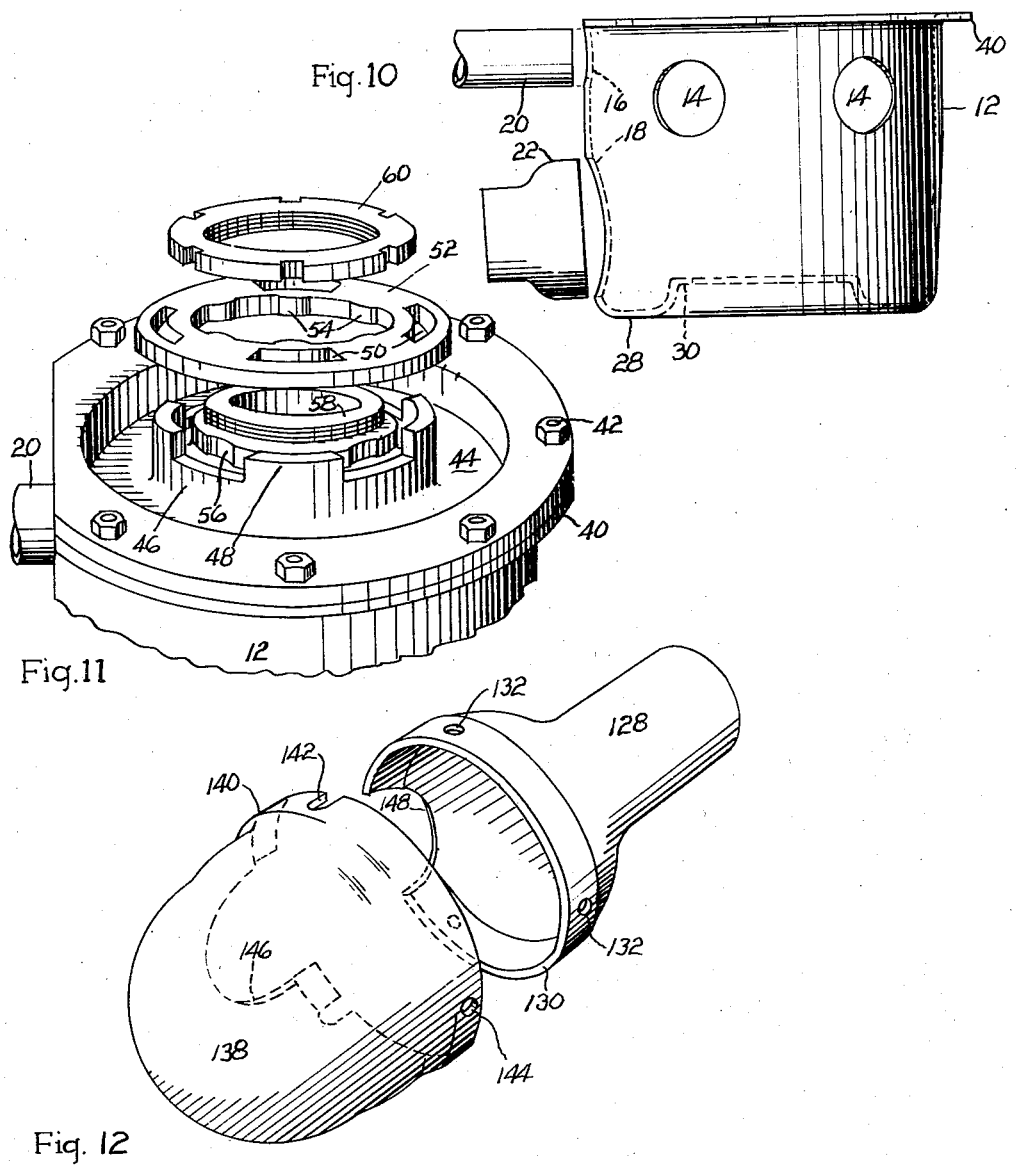

Patented Nov. 28, 1939

2,181,425

UNITED STATES PATENT OFFICE 2,181,425

DRIVING MECHANISM FOR CYCLES

Thomas C. Delaval-Crow and Edward W. Glacy, Bristol, Conn., assignors to General Motors Corporation, Detroit, Mich., a corporation of Delaware Application October 20, 1936, Serial No. 106,618

6 Claims. (Cl. 74—417)

This invention relates to driving mechanism for cycles and comprises all of the features of novelty herein disclosed. An object of the invention is to provide improved means for mounting and protecting driving mechanism, especially to facilitate gear adjustment and support in a chainless drive bicycle. Another object is to provide improved means for mounting and enclosing transmission gearing, especially to facilitate assembly and disassembly of a bicycle rear axle with respect to a frame.

To these ends and also to improve generally upon devices of this character, the invention consists in the various matters hereinafter described and claimed. In its broader aspects, the invention is not necessarily limited to the specific construction selected for illustrative purposes in the accompanying drawings in which Fig. 1 is chiefly a horizontal sectional view of the rear portion of a bicycle.

Fig. 2 is a similar view of the crank hanger and associated parts.

Fig. 3 is a side view of a gear.

Fig. 4 is a perspective view of a ball separator.

Fig. 5 is a perspective view of a supporting block or ring and associated parts.

Figs. 6 and 7 are horizontal sectional views showing a modified construction of a bicycle.

Fig. 8 is an enlarged sectional view partly broken away of parts shown in Fig. 1.

Fig. 9 is a horizontal sectional view of the supporting block or ring of Fig. 1 enlarged.

Fig. 10 is a plan view of the crank hanger casing ready for brazing to frame parts.

Fig. 11 is a perspective view of the parts which secure an anchor block to the crank hanger.

Fig. 12 is a perspective view of casing sections near the rear axle.

Figs. 13 and 14 are horizontal sectional views of a modified construction.

Fig. 15 is a plan view, with parts broken away, of the bicycle of Figs. 1 and 2.

Fig. 16 is a side elevation of the bicycle frame.

The numeral 12 indicates a crank hanger casing having its upper portion provided with openings 14 (Fig. 10) to receive the usual frame tubing and having rear openings 16 and 18 to receive, respectively, a rearwardly extending laterally offset frame tube 20 and an adapter tube 22. Such tubes enter the openings and are preferably brazed to the casing 12. The adapter tube 22 is reduced in diameter at the rear and is brazed to a rearwardly extending frame tube 24 which is connected to the tube 20 by a cross brace 26 at a point where tube 20 begins to be offset laterally. The casing 12 is generally cylindrical and has a dished end wall 28 with an internal flange 30 secured to a flanged nut 32 by a clamping nut 34. The flanged nut is adjustably threaded upon the exterior of a bearing member 36 and secured by a lock nut 38. The bearing member 36 is non-rotary and, as will appear, supports for rotation, together or independently, a shaft and a sleeve.

The casing 12 has an out-turned flange 40 secured by bolts 42 to a dished cap 44 which has an axial flange 46 with a series of projecting lugs 48. The lugs project into corresponding openings 50 of an anchor ring 52 having internal lugs 54 which enter locking recesses 56 in an anchor block 58. A clamping nut 60 is threaded on the end of the anchor block to secure the anchor ring 52 against axial movement on the block. A lock washer 62 secures the nut 60. Thus the anchor block 58 is held from rotation.

A bearing cone 64 is threaded on a pedal shaft 66 and secured in adjusted position by a lock nut 68. Antifriction balls 69 are interposed between a raceway groove of the cone 64 and an opposed raceway groove on the anchor block 58 to rotatably support the shaft. Antifriction balls 70 are also interposed between a raceway groove of the fixed bearing member 36 and a similar cone 72 and lock nut threaded on the opposite end of the shaft. Pedal arms 74 are keyed to the ends of the shaft and secured by nuts 76.

The anchor block 58 and the fixed bearing member 36 are provided with external raceway grooves for a pair of opposed ball bearings 78 and 80, respectively, which rotatably support a sleeve 82. The sleeve has a series of lugs 84 against which a bevel gear 86 is clamped by nuts 88, the hub of the gear also being keyed to the sleeve. The sleeve has a tapered clutch face 90 for cooperation with a similar clutch face on an axially shiftable nut 92 which engages coarse threads 94 on the shaft 66. The nut 92 has a slotted axial flange receiving a lug on a lag spring 96 which frictionally engages a groove in a brake actuator 98 which is splined to the end of an anchoring sleeve 100. The brake actuator 98 and the flange of the nut 92 have co-operating clutch teeth 101 adapted to engage one another. The sleeve 100 is keyed to the anchor block 58 and has a series of keyways for internal lugs on brake discs 102 which alternate with brake discs 104 which have external lugs entering keyways in the rotary sleeve 82.

From the foregoing, it will be seen that, upon rotation of the pedal shaft 66 for forward driving, the nut 92 will be temporarily retarded from rotation and so will be shifted axially by the threads to bring the nut into clutching engagement with the sleeve 82. Thereupon the sleeve is positively driven together with the bevel gear 86 which, as will appear, has a power connection with the rear axle. If the pedal shaft is held stationary while the sleeve is revolving, the nut 92 shifts out of clutching engagement with the sleeve and allows the vehicle to coast, the gear 86, sleeve 82, and outer brake discs 104 turning as a unit. If the shaft is turned backwardly, the nut 92 is shifted to bring its clutch teeth 101 into clutching engagement with the brake actuator 98 which is then forced axially to squeeze the brake discs against each other and against the anchor block 58, thereby braking the vehicle. The coaster brake assembly and pedal shaft, minus one pedal arm, are removable as a unit from the casing 12 upon removal of nuts 34 and 38 and the bolts 42.

The bevel gear 86 drives a bevel gear 105 whose hub has an external raceway groove for an angular contact ball bearing 106 having an outer race ring 108 fitting in the adapter sleeve 22. The gear 105 fits upon a square drive shaft 110 where it is retained endwise by a U-shaped member 112 projecting from a groove of the shaft beyond the flats thereof. The drive shaft extends rearwardly through the frame tube 24 and its rear end has a bevel gear 114 retained by a washer and adjusting nut 116. The hub of the gear 114 has an angular contact raceway groove for antifriction balls 118 held by a retainer 119, these balls running in an internal groove in a supporting ring or block 120 which has threaded engagement with and support from one end of a rear axle 122. The block 120 fits on the tube 24 which extends through a spacing sleeve 124 abutting against the block 120 and supported in a gear housing 128, the tube 24, spacing sleeve 124 and gear housing 128 being brazed together at 126. The gear housing 128 has a rim 130 provided with holes 132 for headed screws 134 which pass through spacing bushings 136 into threaded holes in the block 120, the spacing bushings engaging flats on the block and fitting the rim 130. The spacing bushings and the screws form housing supporting arms projecting radially from the block 120 substantially in the vertical plane of the axle. A removable rear cap 138 has a rim 140 fitting on the rim 130 and provided with a pair of open slots 142 and with a hole 144 for the screws 134. This construction facilitates endwise removal of the cap, the screws at the slots 142 being merely loosened, and the screw at the hole 144 being removed. The screw at the hole 144 normally insures against the cap dropping off accidentally in an axial direction. The cap has a recess 146 and the housing 128 has a recess 148 to closely conform to the hub of a bevel gear 150 secured to a wheel hub 152 and driven by the gear 114. Accurate meshing of teeth is insured by adjusting the entire rear axle and hub assembly with respect to block 120, the opposite end of the axle having a squared section to facilitate turning.

The gear 150 is threaded on the end of the wheel hub 152, the threads 154 being right handed as indicated in Fig. 8 and the gear having an internal flange 156 to abut against the end of the hub. A locking nut 158 has an external flange 160 engaging the internal flange 156, the locking nut having external threads 162 which are left handed to engage corresponding internal threads on the hub. Thus a rotative force applied to the gear 150 in either direction will tend to keep it on the hub, a right hand torque screwing it on the hub and a left hand torque tending to screw in the nut 158. The hub 152 is journalled at the driven end upon a ball bearing 164 supported by a bearing cone 166 threaded on the axle and locked by a nut. At the other end, the hub is journalled on a ball bearing 168 supported by a bearing cone 170 threaded on the axle, a suitable shield 172 being supported by the cone 170 and overlapping the end of the hub. The end of the axle is supported by a forked extension 174 of the frame tube 20 which is clamped between nuts 176 and 178, the nut 176 also locking the cone 170. A frame tube 180 (Fig. 16) with a bracing strut 182 is brazed to the gear housing 128 to furnish further support for the latter and is suitably connected to the frame tubes 184 which are brazed to the crank hanger casing 12.

In Figs. 6 and 7, there is shown a modified construction of chainless or gear drive. A crank hanger casing 200 has an enlargement 202 at one end provided with a flange 204 to which is detachably secured a flanged cap 206. The enlargement is brazed at 208 to the inner half of an adapter sleeve 210 which is internally threaded to receive a threaded race ring 212 of an angular contact ball bearing 214. The balls run in a raceway groove on the hub of a bevel gear 216 which is secured on the end of a hexagonal drive shaft 218. The race ring 212 is axially adjustable by rotation and has a series of spaced lugs to selectively receive a locking pin 220 which projects through a hole of the adapter sleeve from the detachable cap 206.

The bevel gear 216 is driven by an internally flanged bevel gear 222 keyed to a rotatable sleeve 224 and locked by a nut 226. The sleeve 224 is rotatably mounted in a coaster brake housing 228 detachably mounted in the crank hanger casing 200, the housing 228 having an enlargement 230 which abuts against one end of the crank hanger casing. A detachable anchor member 232 is secured to the other end of the housing 228 in abutting relation to casing 200 and is connected by a clip 234 to a frame tube 236. Rotation of a pedal shaft 237 controls driving, coasting and braking of the sleeve 224 and gear 222 in any suitable manner, a suitable mechanism being shown in detail in an application filed by one of the present applicants. The coaster brake housing 228 and pedal shaft assembly, minus the left pedal arm, are removable as a unit from the casing 200 when the cap 206 is taken off.

A frame tube 238 is brazed to the adapter sleeve 210 and to a gear housing 240 which is internally threaded to receive an angular contact race ring 242 of a ball bearing 244. To hold the race ring adjusted, a pin 246 projects into a selected slot of the race ring from a plate 248 detachably secured on the gear casing 240. A bevel gear 250 is secured to the rear end of drive shaft 218 by a nut 252, the hub of the gear having a raceway groove for the ball bearing 244. A cap 254 is detachably secured to the gear housing 240 along the meeting line 256 and has a flanged portion 258 closely surrounding the hub of a bevel gear 260 which is driven by the gear 250. The gear 260 is brazed on a wheel hub 262 against a spoke flange 264, the hub being journalled for rotation on a ball bearing 266 running on an integral enlargement 268 of an axle 270. The cap 254 of the gear casing 240 has brazed thereto a supporting bracket 272 which is forked at the end to removably embrace the axle. A nut 274 and washer clamp the forked bracket against the enlargement 268 of the axle, this nut being accessible through a removable cover (not shown) in the upper portion of the cap 254. The other end of the hub is rotatably supported by a ball bearing 276 engaging a bearing cone 278 threaded on the axle which is removably clamped by nuts 279 in a fork at the rear end of the frame tube 236. Upon loosening the axle nut 274, the housing cap 254 and its forked bracket 272 can be removed from the axle. By loosening the axle nuts 279 and the housing cap 254, the entire rear axle and hub assembly can be taken off the bicycle frame.

In Figs. 13 and 14 there is shown another form of driving gearing. A crank hanger casing 280 has an enlargement 282 to which a cap 284 is detachably secured by screws 286. The casing is preferably of cast metal and the cap of pressed metal. The casing has a tubular extension 288 brazed to a frame tube 290, the casing also having an internal seat which slidably receives the outer race ring of a ball bearing 292. The inner race ring of the bearing is held against a shoulder on the shaft by a bevel gear 296 which is keyed to the shaft and retained by a split ring. The gear 296 is driven by a bevel gear 298 bolted to a rotatable sleeve 300 journalled with respect to the pedal shaft and with respect to a coaster brake housing 302 detachably mounted in the hanger casing 280. The housing 302 has an abutment flange 304 at one end and a securing nut 305 at the other end and is removable endwise with the gear 298 when the cap 284, nut 305 and the left pedal arm are taken off.

The casing tube 290 is brazed at its rear end to a gear housing 306 which is preferably cast. The housing has a seat for a ball bearing 308 whose outer race ring is confined between a shoulder and a split ring 310. The inner race ring of the bearing is secured against a shoulder of the shaft 294 by a bevel gear 312 splined on the shaft and held by a retaining ring 314. The gear 312 drives a bevel gear 316 clamped by a nut 318 on the end of a threaded stub axle 320 which is integral with a wheel hub 322. The stub axle is journalled in a ball bearing 324 whose inner race ring is confined against the hub by the gear 316 and whose outer race ring is confined between flanges in a gear housing 306 and in a mating cap 326 which is detachably secured along the meeting line 328. The wheel hub has its other end provided with an integral stub axle 330 journalled in a ball bearing 332 seated in a semi-cylindrical housing 334 which is brazed to a frame tube 336, the bearing also seating in a detachable cap 338. By removing the caps 326 and 338, the rear hub assembly and bearings are removable as a unit.

We claim:

1. In a device of the character described, an axle, a hub, a driven gear for rotating the hub, a transmission shaft having a driving gear, a housing enclosing the gears, a block secured to the end of the axle, spacing sleeves between the block and the housing, and bolts passing through the sleeves for securing the housing to the block; substantially as described.

2. In a device of the character described, an axle, a hub, a driven gear for rotating the hub, a transmission shaft having a driving gear, a frame tube enclosing the shaft, a block fitting on the tube and secured to the axle, a spacing sleeve surrounding the tube and abutting against the block, a housing mounted on the spacing sleeve and enclosing the gears, and housing supporting means between the block and the housing; substantially as described.

3. In a device of the character described, an axle, a hub having a driven gear, a transmission shaft having a driving gear, a frame tube surrounding the shaft, a housing supported by the frame tube and enclosing the gears, a block connected to the axle and having a series of radially projecting arms, the arms being substantially in the plane of the axle and connected to the housing; substantially as described.

4. In a device of the character described, an axle, a hub having a driven gear, a transmission shaft having a driving gear, a frame tube surrounding the shaft, a housing supported by the frame tube and enclosing the gears, a block connected to the axle and having a series of radially projecting arms, the arms being substantially in the vertical plane of the axle, and the housing comprising a pair of separable sections overlapping one another in said plane and secured to the arms; substantially as described.

5. In a device of the character described, an axle, a hub having a driven gear, a frame tube extending alongside one end of the hub, a transmission shaft extending through the tube and having a driving gear, a hollow block sleeved on the tube and secured to the axle, a housing supported by the frame tube and enclosing the gears, and a series of arms projecting radially from the block and spacing the housing therefrom; substantially as described.

6. In a device of the character described, an axle, a hub having a driven gear, a transmission shaft having a driving gear, a housing enclosing the gears, the housing comprising a main section and a detachable section with overlapping rims, one of the rims having openings and the other having slots open towards the first rim, a supporting block secured to the axle, and headed screws extending through the slots and the openings into the block; substantially as described.

THOMAS C. DELAVAL-CROW.
EDWARD W. GLACY.